(12) United States Patent
Kim

(10) Patent No.: US 6,902,364 B2
(45) Date of Patent: Jun. 7, 2005

(54) FRONT SHIPPING HOOK ASSEMBLY FOR A VEHICLE

(75) Inventor: Ki Chang Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/747,896

(22) Filed: Dec. 29, 2003

(65) Prior Publication Data

US 2004/0202519 A1 Oct. 14, 2004

(30) Foreign Application Priority Data

Apr. 14, 2003 (KR) .................................. 10-2003-0023279

(51) Int. Cl.⁷ .............................................. B62D 25/08
(52) U.S. Cl. ..................................... 410/7; 276/203.02
(58) Field of Search ............................. 410/7, 3, 4, 23, 410/96, 112, 116; 280/495, 504; 248/499; 296/203.1, 204, 203.02

(56) References Cited

U.S. PATENT DOCUMENTS

| | | | | |
|---|---|---|---|---|
| 4,398,743 A | * | 8/1983 | Belsky et al. ............... | 280/495 |
| 5,597,198 A | * | 1/1997 | Takanishi et al. ......... | 296/193.09 |
| 6,467,792 B2 | * | 10/2002 | McCoy et al. ............... | 280/495 |
| 6,540,277 B2 | * | 4/2003 | McCoy et al. ............... | 293/117 |
| 6,578,864 B2 | * | 6/2003 | McCoy et al. ............... | 280/495 |
| 6,729,639 B2 | * | 5/2004 | Tomita ....................... | 280/495 |
| 6,736,449 B2 | * | 5/2004 | Takahashi et al. ......... | 296/203.02 |

FOREIGN PATENT DOCUMENTS

| | | | | | |
|---|---|---|---|---|---|
| JP | 358076340 A | * | 5/1983 | .................... | 410/7 |
| JP | 362023877 A | * | 1/1987 | .................... | 410/7 |
| JP | 10-007032 | | 1/1998 | | |
| KR | 1998-059641 | | 10/1998 | | |

* cited by examiner

Primary Examiner—H. Gutman
(74) Attorney, Agent, or Firm—Morgan Lewis & Bockius LLP

(57) ABSTRACT

A front shipping hook assembly comprises a mounting unit and a front shipping hook. The front shipping hook has a vertical supporting member that is coupled to a side portion of the mounting unit and a horizontal supporting member that is coupled to a lower portion of the mounting unit. Because the front shipping hook is coupled to the mounting unit and the vehicle body through the vertical supporting member and the horizontal mounting member, a concentration of stress can be minimized.

7 Claims, 6 Drawing Sheets

FRONT SHIPPING HOOK ASSEMBLY FOR A VEHICLE

CROSS-REFERENCE TO RELATED APPLICATIONS

This application claims priority to Korean Application No. 10-2003-0023279, filed Apr. 14, 2003.

FIELD OF THE INVENTION

Generally, the present invention relates to a front shipping hook assembly for a vehicle.

BACKGROUND OF THE INVENTION

Typically, a front shipping hook of a vehicle is a device for pulling or tying down a vehicle. The front shipping hook is generally coupled to a lower portion of a front side member of a vehicle. The front shipping hook is often provided with a base portion and a connecting portion. The base portion is coupled to the front side member through a plurality of bolts. The connecting portion is extends downward from the base portion and a hooking hole is formed therein.

The front side member is composed of a front side inner member and a front side outer member. A section of the front side member has a rectangular shape. A sub frame is disposed below the front side member. A mounting unit and reinforcing members are disposed between the front side member and the sub frame. The sub frame, the reinforcing members, and the mounting unit are coupled to each other through a bolt. The typical front shipping hook is provided with a slanted portion that is curved according to a shape of lower extended portions of the front side member and the mounting unit.

When a load is applied to such a prior shipping hook, stresses are concentrated at a right portion of the connecting portion and at a left lower portion of the base portion. Such concentrations of the stress often can damage the front shipping hook.

The information disclosed in this Background of the Invention section is only for enhancement of understanding of the background of the invention and should not be taken as an acknowledgement or any form of suggestion that this information forms the prior art that is known to a person skilled in the art.

SUMMARY OF THE INVENTION

An embodiment provides a front shipping hook assembly that can reduce stress from being concentrated and that has high integrity.

In a preferred embodiment of the present invention, the front shipping hook assembly comprises a mounting unit and a front shipping hook. The mounting unit is coupled to a vehicle body. The front shipping hook has a vertical supporting member that is coupled to a side portion of the mounting unit and a horizontal supporting member that is coupled to a lower portion of the mounting unit. It is coupled to the mounting unit and the vehicle body.

It is preferable that the side portion of the mounting unit is formed of two plates and that the lower portion of the mounting unit is formed of two plates. It is also preferable that the front shipping hook further comprises a connecting portion to which the vertical supporting member and the horizontal supporting members are coupled, and that a hooking hole is formed in the connecting portion.

It is further preferable that a vertical supporting member extends in a first slanted direction from the connecting portion and is then extended vertically. Furthermore, a horizontal supporting member extends in a second slanted direction from the connecting portion and is then extended horizontally. It is also further preferable that the vertical supporting member and the horizontal supporting member have a rectangular plate shape.

Preferably, coupling holes are formed respectively in the vertical and horizontal supporting members and the coupling holes are formed respectively in the side and lower portion of the mounting unit. Further preferably, the coupling hole formed in the vertical supporting member of the front shipping hook is preferably aligned with the coupling hole formed in the side portion of the mounting unit. The coupling hole formed in the horizontal supporting member of the front shipping hook is preferably aligned with the coupling hole formed in the lower portion of the mounting unit.

It is preferable that a flange is integrally formed in the vertical portion of the front shipping hook.

BRIEF DESCRIPTION OF THE DRAWINGS

The accompanying drawings, which are incorporated in and constitute a part of the specification, illustrate an embodiment of the invention, and, read together with the description, serve to explain the principles of the invention, where.

DETAILED DESCRIPTION OF THE PREFERRED EMBODIMENTS

Figure 1:
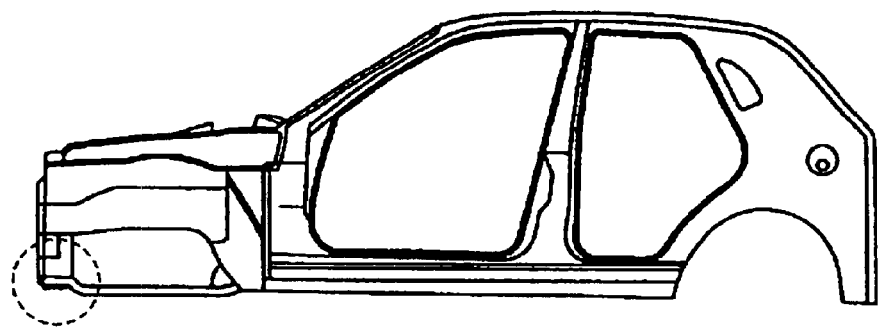
FIG. 1 is a side view of a vehicle to which a front shipping hook assembly is mounted.
Figure 2:
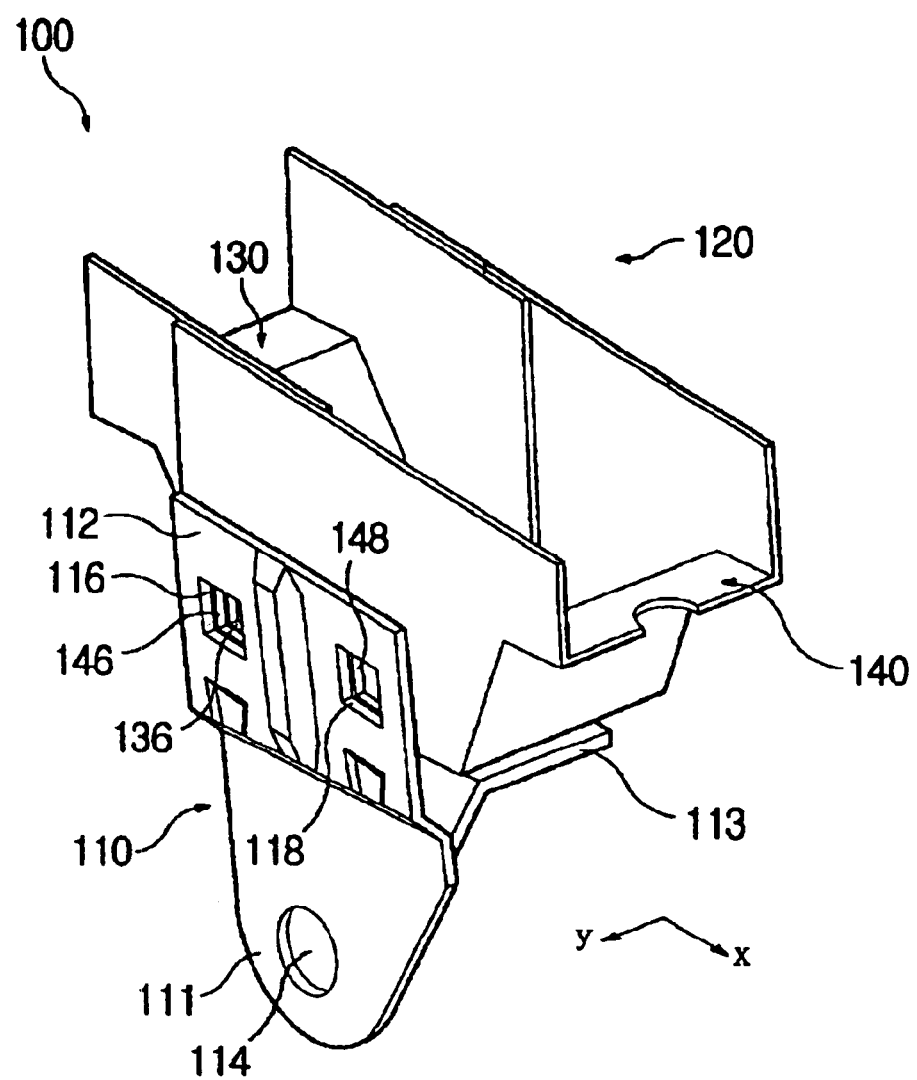
FIG. 2 is a perspective view of a front shipping hook assembly according to an embodiment of the present invention.
Figure 3:
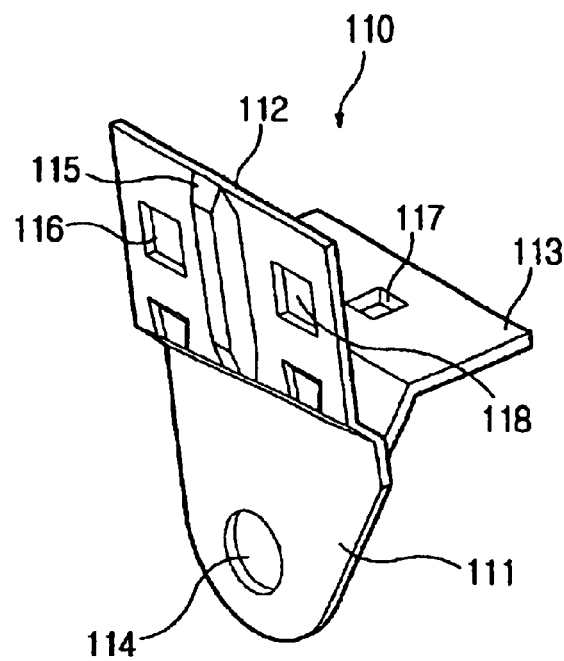
FIG. 3 is a perspective view of a front shipping hook of FIG. 2.

As shown in FIG. 2, a front shipping hook assembly 100 according to the embodiment of the present invention includes a front shipping hook 110 and a mounting unit 120. As shown in FIG. 3, the front shipping hook 110 includes a connecting portion 111, a vertical supporting portion 112, and a horizontal supporting portion 113. The connecting portion 111 has a plate shape, and the connecting portion 111 is positioned to be perpendicular to a lateral direction (direction "Y" of FIG. 2) of a vehicle.

A hooking hole 114 is formed in the connecting portion 111, and the hooking hole 114 is configured to be hooked by a hooking device for pulling or tying down the vehicle. The vertical supporting portion 112 is extended in an inclined direction from the connecting portion 111 and is then extended vertically. The vertical supporting portion 112 has a rectangular plate shape.

A reinforcing protrusion 115 is formed on the vertical supporting portion 112. As shown in the drawing, the reinforcing protrusion 115 is formed along a vertical direction of the vertical supporting portion 112. Coupling holes 116 and 118 are formed on each side of the reinforcing protrusion 115 for bolt coupling. The horizontal supporting portion 113 is extended in an inclined direction from the connecting portion 111 and is then extended horizontally. The horizontal supporting portion 113 has a rectangular plate shape. A coupling hole 117 is formed in the horizontal supporting portion 113 for bolt coupling.

It is preferable that the connecting portion 111, the vertical supporting portion 112 and the horizontal supporting portion 113 are formed as a one-piece unit by press forming or by casting and forging.

The front shipping hook 110 is provided with the vertical supporting portion 112 and the horizontal supporting portion 113 so that a multi-surface supporting structure can be realized. As shown in the drawings, the horizontal supporting portion 113 of the front shipping hook 110 is coupled to a lower surface of the mounting unit 120, and the vertical supporting portion 112 of the front shipping hook 110 is coupled to a side surface of the mounting unit 120.

As shown in FIG. 2, the mounting unit 120 has a rear mounting member 130 and a front mounting member 140 that are coupled to each other. A portion of the rear mounting member 130 is inserted into the front mounting member 140. The mounting unit 120 is a two-piece type that is composed of the rear mounting member 130 and the front mounting member 140.

Figure 4:
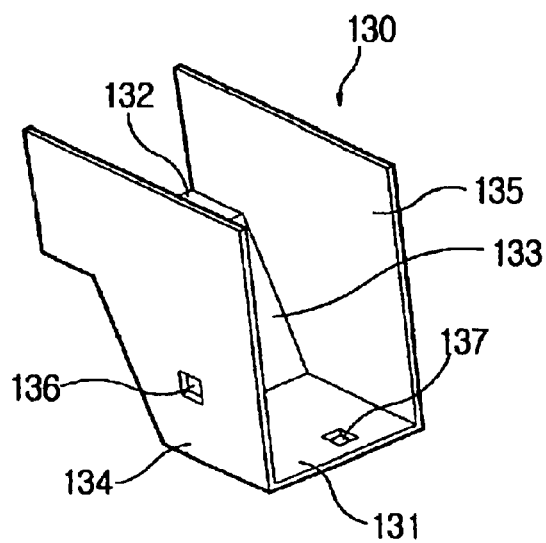
FIG. 4 is a perspective view of a rear mounting member of FIG. 2.

As shown in FIG. 4, a lower portion of the rear mounting member 130 is composed of a first bottom plate 131, a second bottom plate 132, and a slanted plate 133 that is connected to the first bottom plate 131 and the second bottom plate 132 together. That is, the rear mounting member 130 has two steps. The rear mounting member 130 further includes a left plate 134 and a right plate 135 that are upwardly extended from the first bottom plate 131, the second bottom plate 132, and the slanted plate 133. A coupling hole 136 is formed in the left plate 134 for bolt coupling, and a coupling hole 137 is formed in the first bottom plate 131 for bolt coupling. It is preferable that the left plate 134 and the right plate 135 have the same height.

Figure 5:
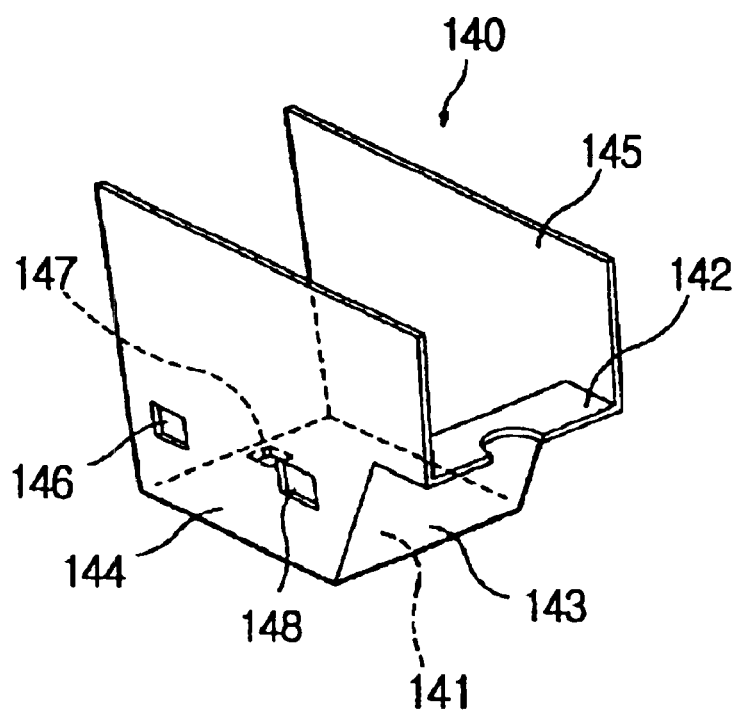
FIG. 5 is a perspective view of a front mounting member of FIG. 2.

As shown in FIG. 5, the front mounting member 140 is generally symmetrical with the rear mounting member 130. A lower portion of the front mounting member 140 is composed of a first bottom plate 141, a second bottom plate 142, and a slanted plate 143 that is connected to first bottom plate 141 and the second bottom plate 142 together.

The front mounting member 140 further includes a left plate 144 and a right plate 145 that are upwardly extended from the first bottom plate 141, the second bottom plate 142, and the slanted plate 143. Coupling holes 146 and 148 are formed in the left plate 144 for bolt coupling, and a coupling hole 147 is formed in the first bottom plate 141 for bolt coupling.

As shown in FIG. 2, because the rear mounting member 130 is inserted into the front mounting member 140, the front mounting member 140 is formed to be wider than the rear mounting member 130. The first bottom plate 141 of the front mounting member 140 is long enough to receive the first bottom plate 131 of the rear mounting member 130. Consequently, the mounting unit 120 provides a horizontal surface and a vertical surface to which the front shipping hook 110 is coupled. Therefore, the mounting unit 120 can be varied while it has the horizontal and vertical surfaces.

The front shipping hook 110 and the mounting unit 120 are coupled to each other as shown in FIG. 2. In FIG. 2, a direction X is a longitudinal direction of a vehicle, and a direction Y is a lateral direction of a vehicle.

A connection between the rear mounting member 130 and the front mounting member 140 will be explained in detail hereinafter. The rear mounting member 130 is inserted into the front mounting member 140 such that the coupling hole 136 formed in the left plate 134 of the rear mounting member 130 is aligned with the coupling hole 146 formed in the left plate 144 of the front mounting member 140. At this time, the coupling hole 137 formed in the first bottom plate 131 of the rear mounting member 130 is aligned with the coupling hole 147 formed in the first bottom plate 141 of the front mounting member 140.

In this situation, the left and right plates 134 and 135 of the rear mounting member 130 respectively contact the left and right plates 144 and 145 of the front mounting member 140. Therefore, lower and side portions of the mounting unit 120 are comprised of two plates, so that integrity of the mounting unit 120 is increased.

As shown in FIG. 2, in a state that the front shipping hook 110 is coupled to the mounting unit 120, the coupling hole 116 of the vertical supporting portion 112 is aligned with the coupling hole 136 of the rear mounting member 130 and the coupling hole 146 of the front mounting member 140, the coupling hole 118 of the vertical supporting portion 112 is aligned with the coupling hole 148 of the front mounting member 140, and the coupling hole 117 of the horizontal supporting portion 113 is coupled to the coupling hole 137 of the rear mounting member 130 and the coupling hole 147 of the front mounting member 140.

Bolt coupling is performed through the aligned coupling holes 116, 146, and 136, bolt coupling is performed through the aligned coupling holes 118 and 148, and bolt coupling is also performed through the aligned coupling holes 117, 147, and 137. Accordingly, the front shipping hook 110 is coupled simultaneously to the rear mounting member 130 and the front mounting member 140.

As a result, the vertical supporting portion 112 of the front shipping hook 110 is coupled simultaneously to the left plate 134 of the rear mounting member 130 and the left plate 144 of the front mounting member 140, and the horizontal supporting portion 113 of the front shipping hook 110 is coupled simultaneously to the first bottom plate 131 of the rear mounting member 130 and the first bottom plate 141 of the front mounting member 140.

Figure 6:
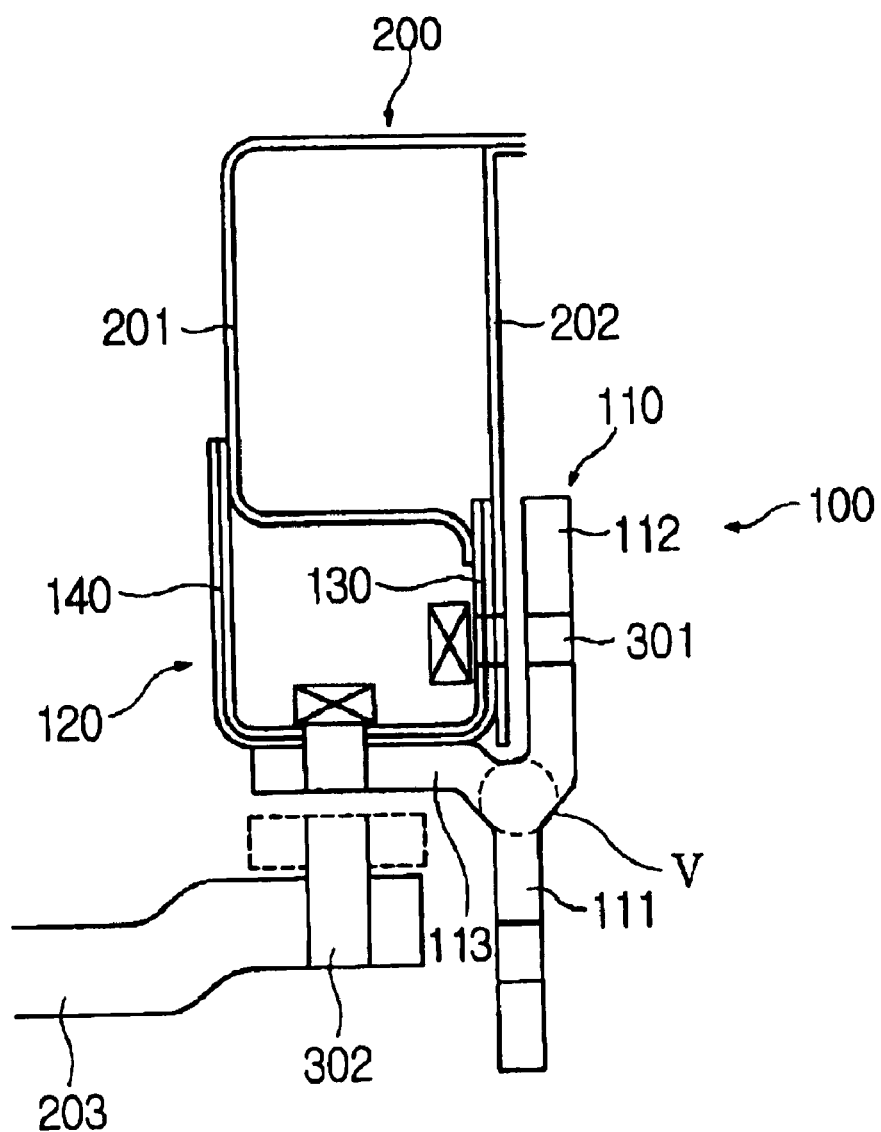
FIG. 6 is a sectional view showing a state in which the front shipping hook assembly of FIG. 2 is coupled to a vehicle body.

FIG. 6 shows a state in which the front shipping hook assembly 100 according to the embodiment of the present invention is connected to a vehicle. As shown in FIG. 6, the rear mounting member 130 and the front mounting member 140 are coupled to a vehicle body 200. For example, the rear mounting member 130 and the front mounting member 140 are coupled to a first frame 201 and a second frame 202 of the vehicle body 200. As an example, the first frame 201 can be a front side inner member, and the second frame 202 can be a front side outer member.

As shown in the drawing, the vertical supporting portion 112 of the front shipping hook 110 is coupled to the mounting unit 120 and the second frame 202 through a bolt 301, and the horizontal supporting portion 113 of the front shipping hook 110 is coupled to the mounting unit 120 and a sub frame 203 through a bolt 302.

Therefore, the front shipping hook 110 is firmly coupled to the vehicle body 200 in a vertical direction and in a horizontal direction, so that a concentration of stress can be prevented. That is, because the front shipping hook is coupled through two surfaces, the stress is dispersed when compared to the shipping hook assembly in which the shipping hook is coupled through one surface. Therefore, the front shipping hook assembly according to the embodiment of the present invention has high integrity without a reinforcing member.

Figure 7:
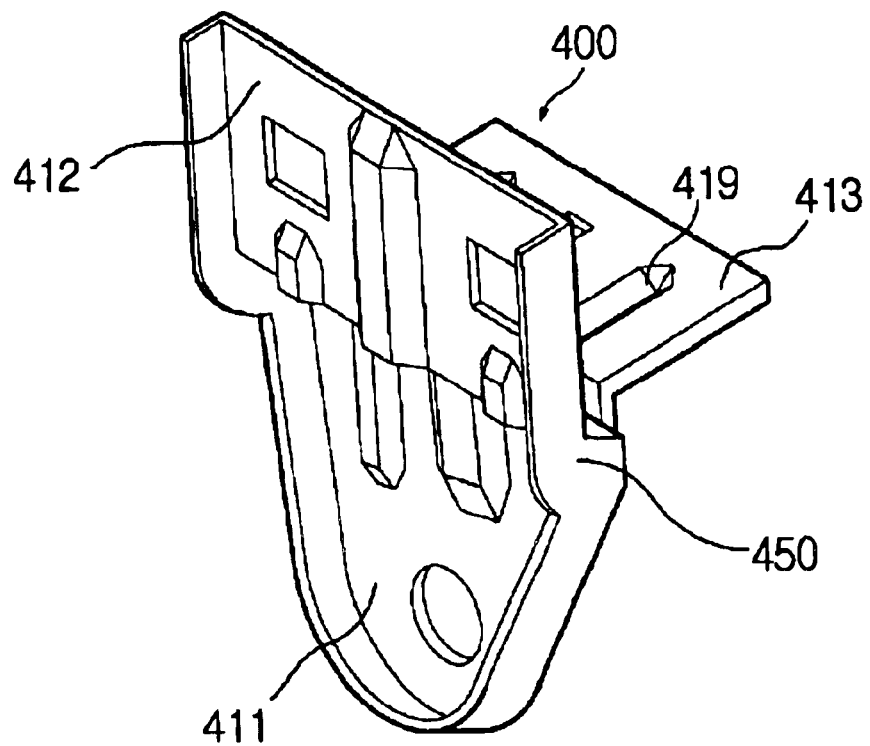
FIG. 7 shows a front shipping hook of a front shipping hook assembly according to another embodiment of the present invention.

FIG. 7 shows a front shipping hook 400 of a front shipping hook assembly according to another embodiment of the present invention. In order to increase integrity of the front shipping hook 400, a flange 450 is provided in a connecting portion 411 and a vertical supporting member 412 of the front shipping hook 400. A plurality of coupling holes 419 are formed in the horizontal supporting member 413.

In the above-stated embodiments, the mounting unit is composed of the rear mounting member and the front mounting member, but the mounting unit can be formed as one body with sufficient integrity.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A front shipping hook assembly comprising:
   a mounting unit that is coupled to a vehicle body;
   a front shipping hook with a vertical supporting member that is coupled to a side portion of the mounting unit and a horizontal supporting member that is coupled to a lower portion of the mounting unit, the front shipping hook being coupled to the mounting unit and the vehicle body; and wherein
   the front shipping hook further comprises a connecting portion to which the vertical supporting member and the horizontal supporting member are coupled, and a hooking hole is formed in the connecting portion; and
   the vertical supporting member is extended in a first slanted direction from the connecting portion and is then extended vertically, and the horizontal supporting member is extended in a second slanted direction from the connecting portion and is then extended horizontally.

2. The front shipping hook assembly of claim 1, wherein the side portion of the mounting unit is formed of two plates, and the lower portion of the mounting unit is formed of two plates.

3. The front shipping hook assembly of claim 1, wherein the vertical supporting member and the horizontal supporting member have a rectangular plate shape.

4. The front shipping hook assembly of claim 1, wherein a flange is integrally formed in the vertical supporting member of the front shipping hook.

5. A front shipping hook assembly comprising:
   a mounting unit that is coupled to a vehicle body;
   a front shipping hook with a vertical supporting member that is coupled to a side portion of the mounting unit and a horizontal supporting member that is coupled to a lower portion of the mounting unit, the front shipping hook being coupled to the mounting unit and the vehicle body; and wherein coupling holes are formed respectively in the vertical and horizontal supporting members, and coupling holes are formed respectively in the side and lower portions of the mounting unit.

6. The front shipping hook assembly of claim 5, wherein the coupling hole formed in the vertical supporting member of the front shipping hook is aligned with the coupling hole formed in the side portion of the mounting unit, and the coupling hole formed in the horizontal supporting member of the front shipping hook is aligned with the coupling hole formed in the lower portion of the mounting unit.

7. A front shipping hook assembly comprising:
   a mounting unit configured and dimensioned to couple with a vehicle body; and
   a front shipping hook having a vertical supporting member configured and dimensioned to couple with a side portion of said mounting unit and a horizontal supporting member configured and dimensioned to couple with a lower portion of the mounting unit; and wherein
   the front shipping hook further comprises a connecting portion to which the vertical supporting member and the horizontal supporting member are coupled, and a hooking hole is formed in the connecting portion;
   the vertical supporting member is extended in a first slanted direction from the connecting portion and is then extended vertically, and the horizontal supporting member is extended in a second slanted direction from the connecting portion and is then extended horizontally.

* * * * *